United States Patent
Uenaka et al.

(10) Patent No.: US 7,903,167 B2
(45) Date of Patent: Mar. 8, 2011

(54) DUST REMOVAL APPARATUS OF PHOTOGRAPHING APPARATUS

(75) Inventors: Yukio Uenaka, Tokyo (JP); Shigeru Iwamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 572 days.

(21) Appl. No.: 11/869,033

(22) Filed: Oct. 9, 2007

(65) Prior Publication Data

US 2008/0084492 A1   Apr. 10, 2008

(30) Foreign Application Priority Data

Oct. 10, 2006   (JP) .................................. 2006-276860

(51) Int. Cl.
*H04N 5/225* (2006.01)
(52) U.S. Cl. ....................... 348/340; 348/219.1; 348/374
(58) Field of Classification Search .................. 348/374, 348/340, 219.1; 396/52–55
See application file for complete search history.

(56) References Cited

U.S. PATENT DOCUMENTS

| | | | | |
|---|---|---|---|---|
| 7,006,138 B2 * | 2/2006 | Kawai | ............................ | 348/340 |
| 7,324,148 B2 * | 1/2008 | Takizawa et al. | ............. | 348/340 |
| 7,365,788 B2 * | 4/2008 | Ito | ................................. | 348/335 |
| 7,486,326 B2 * | 2/2009 | Ito et al. | ........................ | 348/335 |
| 7,548,267 B2 * | 6/2009 | Kosugiyama | ................. | 348/344 |
| 7,580,628 B2 * | 8/2009 | Ide et al. | ....................... | 396/429 |
| 7,595,835 B2 * | 9/2009 | Kosaka | ......................... | 348/335 |
| 7,719,612 B2 * | 5/2010 | Kaihara et al. | ................. | 348/374 |
| 2004/0169761 A1 * | 9/2004 | Kawai et al. | ................... | 348/335 |
| 2005/0264656 A1 * | 12/2005 | Seo et al. | .................... | 348/219.1 |
| 2008/0037980 A1 * | 2/2008 | Okumura et al. | ............. | 396/535 |

FOREIGN PATENT DOCUMENTS

| | | |
|---|---|---|
| JP | 2004 56368 | 2/2004 |
| JP | 2005 340988 | 12/2005 |

* cited by examiner

*Primary Examiner* — Tuan Ho
*Assistant Examiner* — Kent Wang
(74) *Attorney, Agent, or Firm* — Greenblum & Bernstein, P.L.C.

(57) ABSTRACT

A dust removal apparatus of a photographing apparatus comprises a movable unit and a controller. The movable unit has an imaging device and is movable. The controller strikes the movable unit against a boundary of a range of movement of the movable unit as a dust removal operation. The controller counts the number of times of the dust removal operation, measures an elapsed time from the point when counting the number of times of the dust removal operation commences. When the elapsed time is less than or equal to a time period and the number of times of the dust removal operation is equal to or greater than a predetermined number of times, the controller halts the dust removal operation until a predetermined time period has elapsed.

16 Claims, 10 Drawing Sheets

DUST REMOVAL APPARATUS OF PHOTOGRAPHING APPARATUS

BACKGROUND OF THE INVENTION

1. Field of the Invention

The present invention relates to a dust removal apparatus of a photographing apparatus, and in particular to restrain the damage to the mechanism caused by the dust removal operation.

2. Description of the Related Art

A dust removal apparatus of a photographing apparatus, that removes the dust on the imaging device and the cover such as the low-pass filter, is proposed.

Japanese unexamined patent publication (KOKAI) No. 2005-340988 discloses a dust removal apparatus that strikes the movable unit including the imaging device against the boundary of the range of movement of the movable unit so that the shock of impact will remove the dust on the imaging device and the cover etc.

However, the movable unit 30a etc. may sustain damage caused by heat and shock from continuous impact between the movable unit and the boundary of the range of movement of the movable unit.

SUMMARY OF THE INVENTION

Therefore, an object of the present invention is to provide a dust removal apparatus that reduces damage the mechanism during the dust removal operation and removes the dust more efficiently.

According to the present invention, a dust removal apparatus of a photographing apparatus comprises a movable unit and a controller. The movable unit has an imaging device and is movable. The controller strikes the movable unit against a boundary of a range of movement of the movable unit as a dust removal operation. The controller counts the number of times of the dust removal operation, measures an elapsed time from the point when counting the number of times of the dust removal operation commences. When the elapsed time is less than or equal to a time period and the number of times of the dust removal operation is equal to or greater than a predetermined number of times, the controller halts the dust removal operation until a predetermined time period has elapsed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
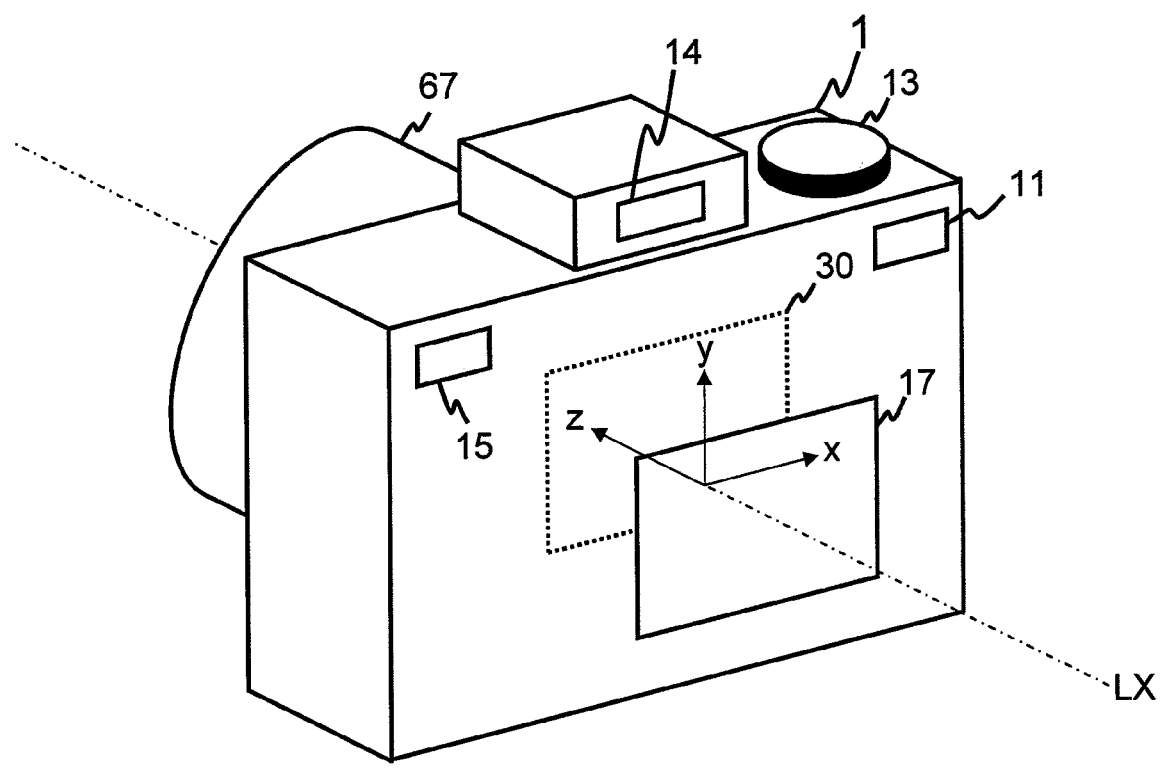
FIG. 1 is a rearview perspective of the embodiment of the photographing apparatus viewed from the back side.

The present invention is described below with reference to the embodiment shown in the drawings. In the embodiment, the photographing apparatus 1 is a digital camera. A photographing optical system, such as a camera lens 67 etc., that captures (images) an optical image on a photographing surface of the imaging device of the photographing apparatus 1 has an optical axis LX.

In order to explain the orientation of the embodiment, a first direction x, a second direction y, and a third direction z are defined (see FIG. 1). The first direction x is perpendicular to the optical axis LX. The second direction y is perpendicular to the optical axis LX and the first direction x. The third direction z is parallel to the optical axis LX and perpendicular to both the first direction x and the second direction y.

Figure 2:
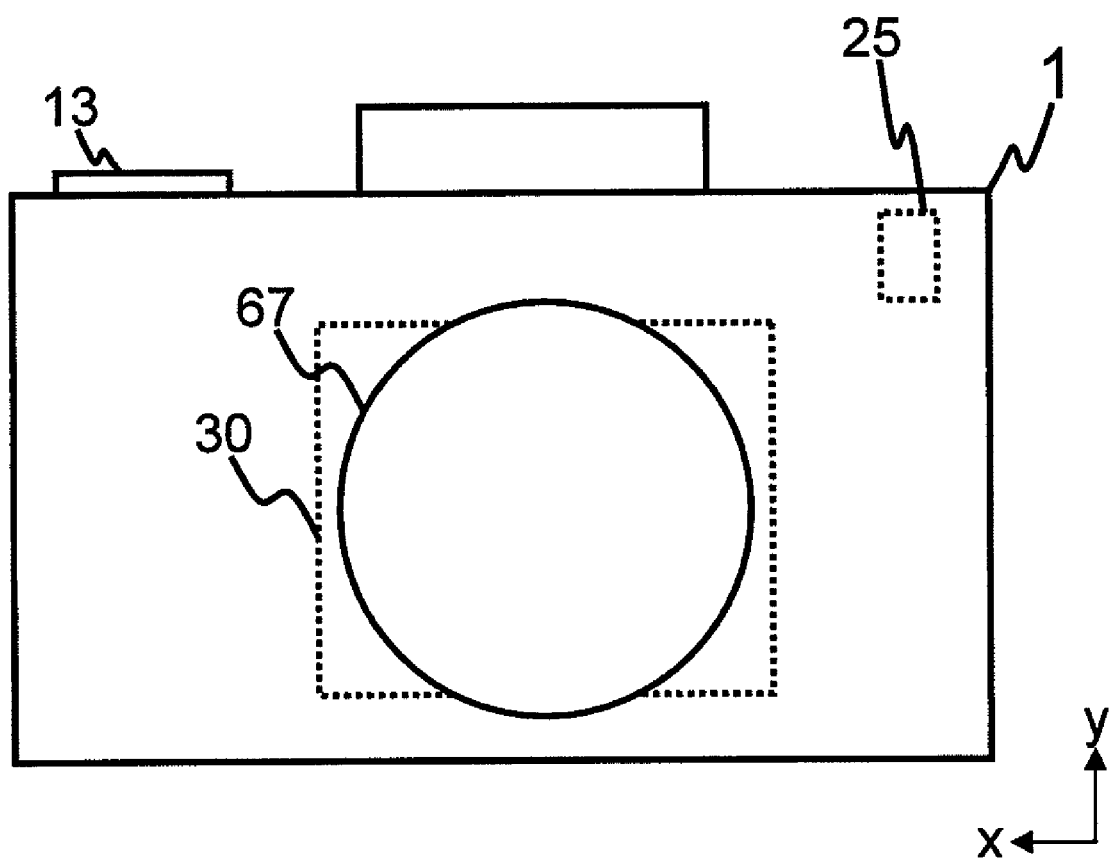
FIG. 2 is a front view of the photographing apparatus.
Figure 3:
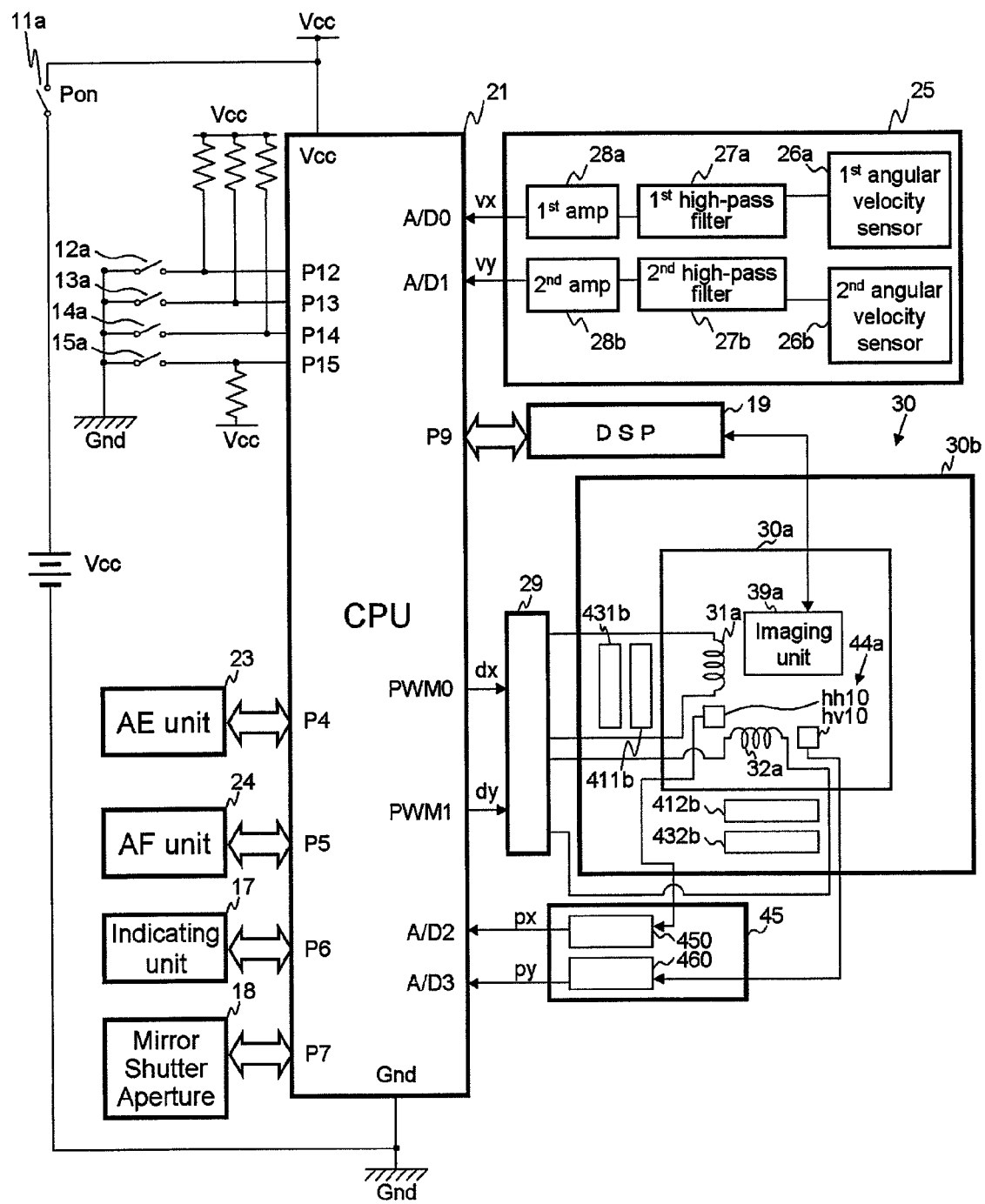
FIG. 3 is a circuit construction diagram of the photographing apparatus.

The imaging and the dust removal part (the dust removal apparatus) of the photographing apparatus 1 comprises a PON button 11, a PON switch 11a, a photometric switch 12a, a release button 13, a release switch 13a, an anti-shake button 14, an anti-shake switch 14a, a dust removal button 15, a dust removal switch 15a, an indicating unit 17 such as an LCD monitor etc., a mirror-aperture-shutter unit 18, a DSP 19, a CPU 21, an AE (automatic exposure) unit 23, an AF (automatic focus) unit 24, an anti-shake unit 30, and a camera lens 67 (see FIGS. 1, 2, and 3).

Whether the PON switch 11a is in the ON state or the OFF state is determined by the state of the PON button 11, so that the ON/OFF states of the photographing apparatus 1 correspond to the ON/OFF states of the PON switch 11a.

The photographic subject image is captured as the optical image through the camera lens 67 by the imaging unit 39a, and the captured image is displayed on the indicating unit 17. The photographic subject image can be optically observed by the optical finder (not depicted).

Further, after the PON button 11 is depressed so that the photographing apparatus 1 is set to the ON state, a dust removal operation is performed in a first time period (220 ms).

The number of times of the dust removal operation, from the point when counting the number of times of the dust removal operation commences (the point when the first dust removal operation commences) to the point when a third time period (10000 ms) has elapsed, is limited to less than or equal to the predetermined number of times (10 times) in order to prevent damage to the movable unit 30a etc. caused by the heat and shock from continuous impact between the movable unit 30a and the boundary of the range of movement of the movable unit 30a. The control of the limitation of the number of times of the dust removal operation is explained later.

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the image which is captured, is stored.

Whether the dust removal switch 15a is in the ON state or the OFF state is determined by the state of the dust removal button 15.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the release switch 13a.

The DSP 19 is connected to port P9 of the CPU 21, and it is connected to the imaging unit 39a. Based on a command from the CPU 21, the DSP 19 performs the calculation operations, such as the image processing operation etc., on the image signal obtained by the imaging operation of the imaging unit 39a.

The CPU 21 is a control apparatus that controls each part of the photographing apparatus 1 regarding the imaging operation, the dust removal operation, and the anti-shake operation (i.e. the image stabilizing operation). The anti-shake operation includes both the movement of the movable unit 30a and position detection efforts.

Further, the CPU 21 stores a value of the anti-shake parameter IS that determines whether the photographing apparatus 1 is in the anti-shake mode or not, a value of a release state parameter RP, a value of a dust removal state parameter GP, a value of a dust removal time parameter CNT, a value of a count start parameter GEN, a value of a time count parameter GCNT, and a value of a number count parameter NUG.

The value of the release state parameter RP changes with respect to the release sequence operation. When the release sequence operation is performed, the value of the release state parameter RP is set to 1 (see steps S33 to S40 in FIG. 4); and when the release sequence operation is finished, the value of the release state parameter RP is set (reset) to 0 (see steps S13 and S41 in FIG. 4).

The dust removal state parameter GP is a parameter that indicates whether the dust removal operation is finished.

Figure 4:
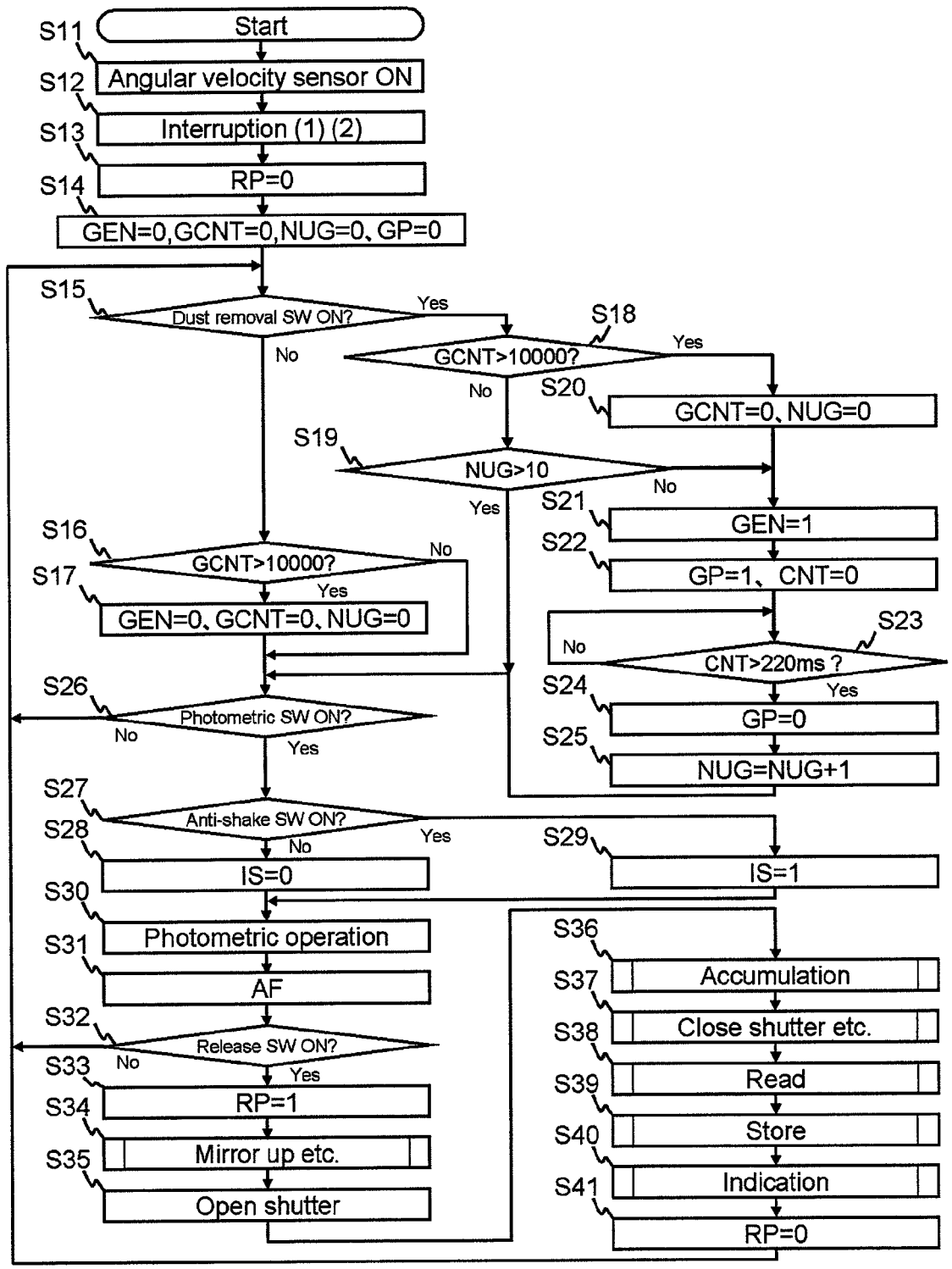
FIG. 4 is a flowchart that shows the main operation of the photographing apparatus.

The value of the dust removal state parameter GP is set to 1 when the dust removal operation is underway, under the first condition from the point in time when a dust removal operation commences until the point in time when the dust removal operation is finished, and under the second condition (see step S22 in FIG. 4).

The value of the dust removal state parameter GP is set to 0 at the completion of the dust removal operation; in other words, when the first time period (220 ms) that began with the commencement of the dust removal operation has elapsed (see step S24 in FIG. 4).

The second condition occurs when the dust removal switch 15a is set to the ON state and either the third time period (10000 ms), which began with the commencement of counting the number of times of the dust removal operation, has elapsed; or the third time period that began with the commencement of counting the number of times of the dust removal operation has not yet elapsed and the number of times of the dust removal operation has not been equal to or greater than the predetermined number of times (10 times).

The dust removal time parameter CNT is used for measuring the length of time it takes to perform one dust removal operation. An initial value of the dust removal time parameter CNT is set to 0. While the dust removal operation is being performed, the value of the dust removal time parameter CNT is increased by the value of 1 at every predetermined time interval of 1 ms. (see step S71 in FIG. 7).

The count start parameter GEN is used for measuring the continuous length of time the dust removal operations are performed (the elapsed time from the point when counting the number of times of the dust removal operation commences) The value of the count start parameter GEN is set to 1, under the first and second conditions. Otherwise, the value of the count start parameter GEN is set to 0.

The time count parameter GCNT is used for measuring the continuous length of time the dust removal operations are performed (the elapsed time from the point when counting the number of times of the dust removal operation commences). While the count start parameter GEN is set to 1, the value of the time count parameter GCNT is increased by the value of 1 at every predetermined time interval of 1 ms. (see step S62 in FIG. 10).

The value of the time count parameter GCNT is set to 0 (reset, see steps S17 and S20 in FIG. 4), when the value of the time count parameter GCNT exceeds 10000 (when the elapsed time, from the point when counting the number of times of the dust removal operation commences exceeds 10000 ms).

The number count parameter NUG is used for counting the number of times of the dust removal operation. The initial value of the number count parameter NUG is 0. The value of the number count parameter NUG is increased by 1 (see step S25 in FIG. 4), every dust removal operation is performed. The value of the number count parameter NUG is set to 0 (reset, see step S20 in FIG. 4), when the value of the time count parameter GCNT exceeds 10000.

Figure 7:
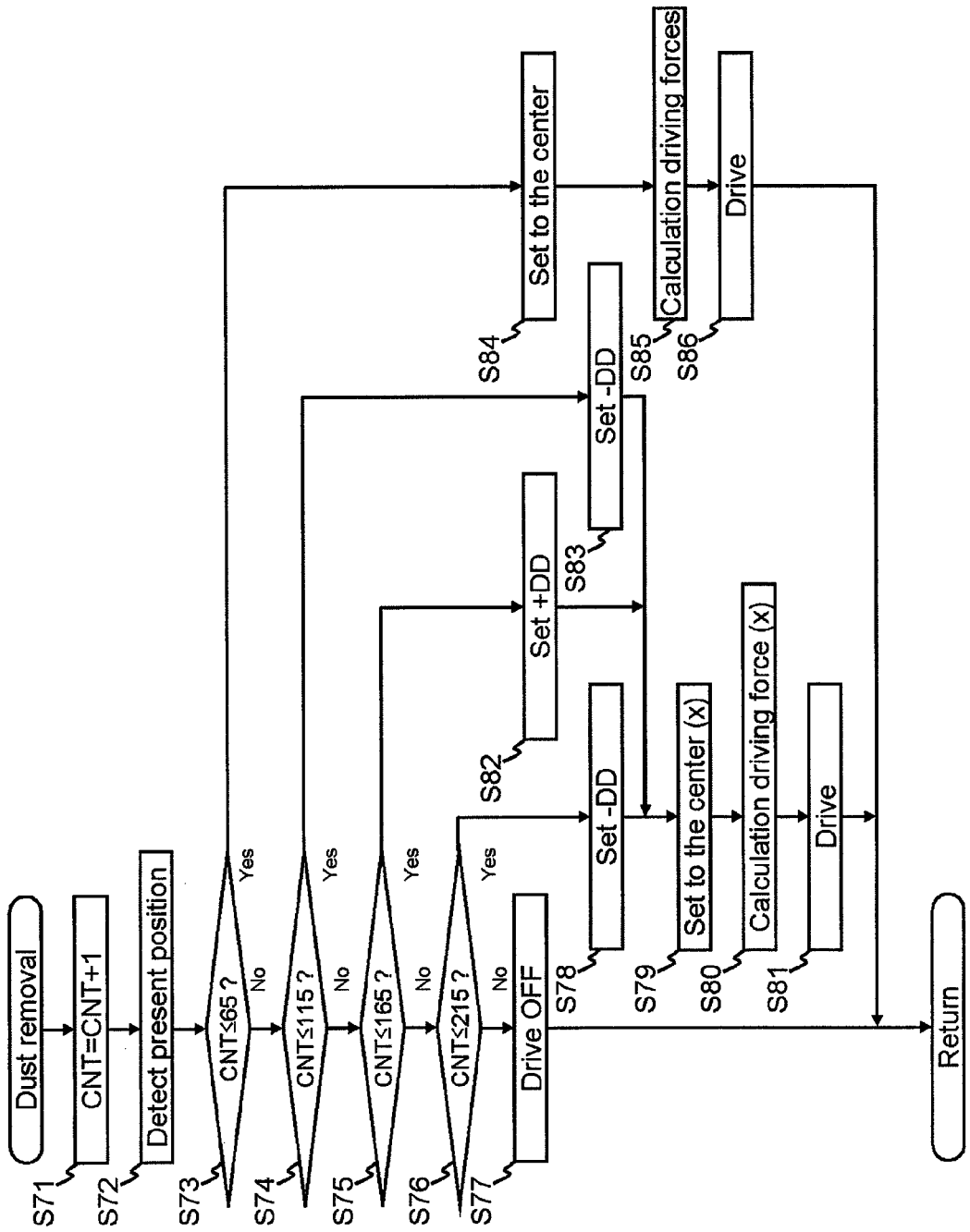
FIG. 7 is a flowchart that shows the dust removal operation.

The CPU 21 moves the movable unit 30a to the predetermined position in the dust removal operation before the anti-shake operation (the centering operation, see step S84 in FIG. 7). In the embodiment, the predetermined position is the center of the range of movement (where the coordinate values in the first direction x and in the second direction y are both 0).

Then, the CPU 21 moves the movable unit 30a in the second direction y to strike against one side of the boundary of the range of movement of the movable unit 30a under the condition where the coordinate value in the first direction x of the movable unit 30a is held constant at the center (a primary collision, see step S83 in FIG. 7). Next, the CPU 21 moves the movable unit 30a in the opposite direction to strike against the other side of the boundary of the range of movement of the movable unit 30a under the condition where the coordinate value in the first direction x of the movable unit 30a is held constant at the center (a secondary collision, see step S82 in FIG. 7). Finally, the CPU 21 moves the movable unit 30a again in the second direction y to strike against one side of the boundary of the range of movement of the movable unit 30a under the condition where the coordinate value in the first direction x of the movable unit 30a is held constant at the center (a final collision, see step S78 in FIG. 7). Namely, the movable unit 30a strikes against the boundary of the range of movement of the movable unit 30a (against the fixed unit 30b) three times in total, during one dust removal operation.

The dust on the imaging unit 39a of the movable unit 30a (the imaging device and the low-pass filter) is removed by the shock of the impact of the movable unit 30a against the boundary of the range of movement of the movable unit 30a.

After the dust removal operation is complete, the anti-shake operation commences.

Specifically, in the primary collision of the dust removal operation, the movable unit 30a is moved from the predetermined position (the center of the range of movement) to one (first) side of the boundary of the range of movement of the movable unit 30a in the second direction y.

In the secondary collision of the dust removal operation, the movable unit 30a is moved from one side of the boundary of the range of movement of the movable unit 30a to the other side of the boundary of the range of movement of the movable unit 30a in the second direction y.

In the final collision of the dust removal operation, the movable unit 30a is moved from the other side of the boundary of the range of movement of the movable unit 30a back to the first side of the boundary of the range of movement of the movable unit 30a in the second direction y.

Therefore, a force of impact in the primary collision is less than a force of impact in the secondary (and final) collision.

With the small force of impact in the primary collision, the movable unit 30a is prepared (primed) in a condition to facilitate the ease of dust removal. Next, by the large force of impact in the secondary (or final) collision, whose force of impact is greater than that of the primary collision, the dust on the imaging unit 39a of the movable unit 30a is removed.

Therefore, damage to the imaging device of the imaging unit 39a can be restrained and the dust can be removed efficiently, compared to the case where the movable unit 30a is moved to the boundary of the range of movement of the movable unit 30a without the centering operation.

The CPU 21 measures the continuous length of time the dust removal operations are performed (the elapsed time from the point when counting the number of times of the dust removal operation commences) and counts the number of times of the dust removal operation during the elapsed time by using the count start parameter GEN, the time count parameter GCNT, and the number count parameter NUG.

When the elapsed time is less than or equal to the third time period (10000 ms) and the number of times (cycles) of the dust removal operation is equal to or greater than the predetermined number of times (10 times), the CPU 21 halts (stops) the dust removal operation until the third time period, beginning from the point when counting the number of times of the dust removal operation commences, has elapsed. In other words, the CPU 21 resumes the dust removal operation after the third time period has elapsed (even if the number of times of the dust removal operation exceeds the predetermined number of times).

While the elapsed time is less than or equal to the third time period (10000 ms), the number of times of the dust removal operation is restricted to less than or equal to the predetermined number of times (10 times).

Further, the CPU 21 stores values of a first digital angular velocity signal $Vx_n$, a second digital angular velocity signal $Vy_n$, a first digital angular velocity $VVx_n$ a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$ after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, and a second differential coefficient Tdy.

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part (the anti-shake apparatus) of the photographing apparatus 1 comprises an anti-shake button 14, an anti-shake switch 14a, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out at every predetermined time interval of 1 ms. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0).

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal. The information regarding whether the dust removal switch 15a is in the ON state or OFF state is input to port P15 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1). The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes signal elements that are based on a null voltage and a panning-motion, neither of which are related to hand-shake.

The second high-pass filter circuit 27b reduces a low frequency component of the signal output from the second angular velocity sensor 26b, because the low frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity vx.

The second amplifier 28b amplifies a signal regarding the pitching angular velocity, whose low frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut-off frequency of the secondary part of the digital high-pass filter processing operation is higher than that of the primary part of the analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state.

The CPU 21 converts the first angular velocity vx, which is input to the A/D converter A/D 0, to a first digital angular velocity signal $Vx_n$ (A/D conversion operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly, the CPU 21 converts the second angular velocity vy, which is input to the A/D converter A/D 1, to a second digital angular velocity signal $Vy_n$ (A/D conversion operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

"n" is an integer that is greater than 0 and indicates a length of time (ms) from the commencement of the first and second interruption processes of the timer, (t=0; see step S12 in FIG. 4) to the point when the latest anti-shake operation is performed (the first and second interruption processes of the timer are performed) (t=n).

Figure 6:
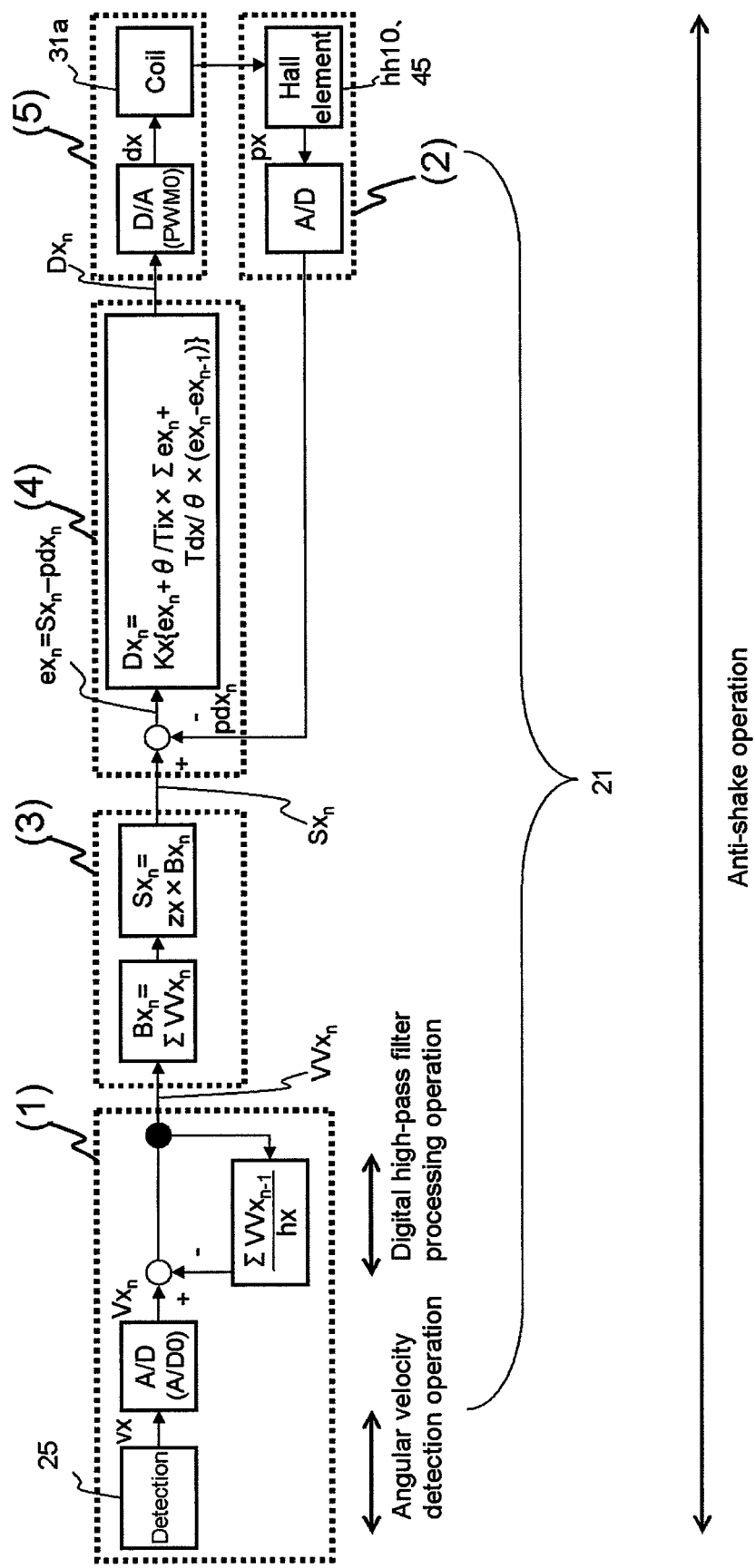
FIG. 6 is a figure that shows the calculations of the anti-shake operation.

In the digital high-pass filter processing operation regarding the first direction x, the first digital angular velocity $VVx_n$ is calculated by dividing the summation of the first digital angular velocity $VVx_0$ to $VVx_{n-1}$ calculated by the first interruption process of the timer before the predetermined time interval of 1 ms (before the latest anti-shake operation is performed), by the first high-pass-filter time constant hx, and then subtracting the resulting quotient from the first digital angular velocity signal $Vx_n$ ($VVx_n=Vx_n-(\Sigma VVx_{n-1})\div hx$, see (1) in FIG. 6).

In the digital high-pass filter processing operation regarding the second direction y, the second digital angular velocity $VVy_n$ is calculated by dividing the summation of the second digital angular velocity $VVy_0$ to $VVy_{n-1}$ calculated by the first interruption process of the timer before the predetermined time interval of 1 ms (before the latest anti-shake operation is performed), by the second high-pass filter time constant hy, and then subtracting the resulting quotient from the second digital angular velocity signal $Vy_n$ ($VVy_n=Vy_n-(\Sigma VVy_{n-1})\div hy$).

In the embodiment, the angular velocity detection operation in (portion of) the first interruption process of the timer includes a process in the angular velocity detection unit 25 and a process of inputting the first and second angular velocities vx and vy from the angular velocity detection unit 25 to the CPU 21.

In the integration processing operation regarding the first direction x, the first digital displacement angle $Bx_n$ is calculated by the summation from the first digital angular velocity $VVx_0$ at the point when the first interruption process of the timer commences, t=0, (see step S12 in FIG. 4) to the first digital angular velocity $VVx_n$ at the point when the latest anti-shake operation is performed (t=n), ($Bx_n=\Sigma VVx_n$, see (3) in FIG. 6).

Similarly, in the integration processing operation regarding the second direction y, the second digital displacement angle $By_n$ is calculated by the summation from the second digital angular velocity $VVy_0$ at the point when the first interruption process of the timer commences to the second digital angular velocity $VVy_n$ at the point when the latest anti-shake operation is performed ($By_n=\Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) that is calculated for the first direction x and the second direction y on the basis of a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electro-magnetic force and is described later.

The driving force $D_n$ drives the driver circuit 29 in order to move the movable unit 30a to the position $S_n$. The coordinate of the driving force $D_n$ in the first direction x is defined as the first driving force Dxn (after D/A conversion: a first PWM duty dx). The coordinate of the driving force $D_n$ in the second direction y is defined as the second driving force $Dy_n$ (after D/A conversion: a second PWM duty dy).

The first PWM duty dx is a duty ratio of the driving pulse corresponding to the first driving force $Dx_n$. The second PWM duty dy is a duty ratio of the driving pulse corresponding to the second driving force $Dy_n$.

However, the position $S_n$ where the imaging unit 39a (the movable unit 30a) should be moved in the first time period (220 ms) for the dust removal operation before the anti-shake operation is performed, is set to a value that does not correspond to the hand-shake quantity (see step S79 in FIG. 7).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n = zx \times Bx_n$, see (3) in FIG. 6).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n = zy \times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device during the exposure time when the anti-shake operation is performed (IS=1).

The anti-shake unit 30 has a fixed unit 30b that forms the boundary of the range of movement of the movable unit 30a, and a movable unit 30a which includes the imaging unit 39a and can be moved about on the xy plane that is parallel to the first direction x and the second direction y.

During the exposure time when the anti-shake operation is not performed (IS=0), the movable unit 30a is fixed to (held in) the predetermined position (at the center of the range of movement).

In the first time period (220 ms) after the photographing apparatus 1 is set to the ON state, the movable unit 30a is driven to the predetermined position that is the center of the range of movement. Next, the movable unit 30a is driven to (is struck against) the boundary of the range of movement in the second direction y.

Otherwise (except for the first time period and the exposure time), the movable unit 30a is not driven (moved).

The anti-shake unit 30 does not have a fixed-positioning mechanism that maintains the movable unit 30a in a fixed position when the movable unit 30a is not being driven (drive OFF state).

The driving of the movable unit 30a of the anti-shake unit 30, including movement to a predetermined fixed (held) position, is performed by the electromagnetic force of the coil unit for driving and the magnetic unit for driving, through the driver circuit 29 which has the first PWM duty dx input from the PWM 0 of the CPU 21 and has the second PWM duty dy input from the PWM 1 of the CPU 21 (see (5) in FIG. 6).

The detected position $P_n$ of the movable unit 30a, either before or after the movement effected by the driver circuit 29, is detected by the hall element unit 44a and the hall-element signal-processing unit 45.

Information regarding the first coordinate of the detected position $P_n$ in the first direction x, in other words a first detected position signal px, is input to the A/D converter A/D 2 of the CPU 21 (see (2) in FIG. 6). The first detected position signal px is an analog signal that is converted to a digital signal by the A/D converter A/D 2 (A/D conversion operation). The first coordinate of the detected position $P_n$ in the first direction x, after the A/D conversion operation, is defined as $pdx_n$ and corresponds to the first detected position signal px.

Information regarding the second coordinate of the detected position $P_n$ in the second direction y, in other words a second detected position signal py, is input to the A/D converter A/D 3 of the CPU 21. The second detected position signal py is an analog signal that is converted to a digital signal by the A/D converter A/D 3 (A/D conversion operation). The second coordinate of the detected position $P_n$ in the second direction y, after the A/D conversion operation, is defined as $pdy_n$ and corresponds to the second detected position signal py.

The PID (Proportional Integral Differential) control calculates the first and second driving forces $Dx_n$ and $Dy_n$ on the basis of the coordinate data for the detected position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle θ, the first integral coefficient Tix, and the first differential coefficient Tdx ($Dx_n = Kx \times \{ex_n + \theta \div Tix \times \Sigma ex_n + Tdx \div \theta \times (ex_n - ex_{n-1})\}$, see (4) in FIG. 6). The first subtraction value $ex_n$ is calculated by subtracting the first coordinate of the detected position $P_n$ in the first direction x after the A/D conversion operation, $pdx_n$, from the coordinate of position $S_n$ in the first direction x, $Sx_n$ ($ex_n = Sx_n - pdx_n$).

The calculation of the second driving force $Dy_n$ is based on the second subtraction value $ey_n$, the second proportional coefficient Ky, the sampling cycle θ, the second integral coefficient Tiy, and the second differential coefficient Tdy ($Dy_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected position $P_n$ in the second direction y after the A/D conversion operation, $pdy_n$, from the coordinate of position $S_n$ in the second direction y, $Sy_n$ ($ey_n = Sy_n - pdy_n$).

The value of the sampling cycle θ is set to the predetermined time interval of 1 ms.

Driving the movable unit 30a to the position $S_n$, ($Sx_n, Sy_n$) corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

In the dust removal operation, from the point when the photographing apparatus 1 is set to the ON state until the anti-shake operation commences, the movable unit 30a is first moved to the center of the range of movement, then moved to one side of the boundary of the range of movement in the second direction y (the primary collision), then moved to the opposite side of the boundary of the range of movement in the second direction y (the secondary collision), then moved again to the original side of the boundary of the range of movement in the second direction y (the final collision), in order. In this period, the coordinate of the movable unit 30a in the first direction x is held constant at the center.

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the embodiment, the imaging device is a CCD; however, the imaging device may be another imaging device such as a CMOS etc.

A rectangle shape, which is the form of the imaging surface of the imaging device, has two sides that are parallel to the first direction x and has two sides that are parallel to the second direction y and that are shorter than the two sides parallel to the first direction x, under the condition where the control of movement of the movable unit 30a is not performed.

Accordingly, the range of movement of the movable unit 30a in the first direction x is longer (wider) than that in the second direction y.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction y.

The fixed unit 30b has a buffer member that absorbs the shock at the point of contact with the movable unit 30a (at the boundary of the range of movement).

The hardness of the buffer member is set so that the part making contact, such as the movable unit 30a etc., is not damaged by the shock of the impact, and the dust on the movable unit 30a is removed by the shock of the impact, when the movable unit 30a is moved to the boundary of the range of movement of the movable unit 30a and struck against the fixed unit 30b through the buffer member.

In the embodiment, the buffer member is attached to the fixed unit 30b, however, the buffer member may be attached to the movable unit 30a.

When the center area of the imaging device intersects by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

The rectangle shape, which is the form of the imaging surface of the imaging device, has two diagonal lines. In the embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electro-magnetic force to move the movable unit 30a that includes the second driving coil 32a, in the second direction y.

The second electromagnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b on the side of the movable unit 30a in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b on the side of the movable unit 30a in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected position signal px and the second detected position signal py specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411*b* in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44*a* facing an intermediate area between the N pole and S pole of the second position-detecting and driving magnet 412*b* in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal ha11 element hh10.

The first hall-element signal-processing circuit 450 outputs the first detected position signal px, which specifies the first coordinate of the position $P_n$ of the movable unit 30*a* in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected position signal py, which specifies the second coordinate of the position $P_n$ of the movable unit 30*a* in the second direction y, to the A/D converter A/D 3 of the CPU 21, on the basis of the vertical potential-difference y10.

Next, the main operation of the photographing apparatus 1 in the embodiment is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

In step S12, the first and second interruption processes of the timer commence at the predetermined time interval (1 ms). In step S13, the value of the release state parameter RP is set to 0. The detail of the first interruption process of the timer is explained later by using the flowchart in FIG. 5. The detail of the second interruption process of the timer is explained later by using the flowchart in FIG. 10.

In step S14, the value of the count start parameter GEN, the value of the time count parameter GCNT, the number count parameter NUG, and the value of the dust removal state parameter GP is set to 0.

In step S15, it is determined whether the value of the dust removal switch 15*a* is set to the ON state. When it is determined that the value of the dust removal switch 15*a* is set to the ON state, the operation proceeds directly to step S18; otherwise, the operation continues to step S16.

In step S16, it is determined whether the value of the time count parameter GCNT is greater than 10000. When it is determined that the value of the time count parameter GCNT is greater than 10000, the operation continues to step S17; otherwise, the operation proceeds directly to step S26.

In step S17, the value of the count start parameter GEN, the value of the time count parameter GCNT, and the value of the number count parameter NUG are set to 0.

In step S18, it is determined whether the value of the time count parameter GCNT is greater than 10000. When it is determined that the value of the time count parameter GCNT is greater than 10000, the operation proceeds directly to step S20; otherwise, the operation continues to step S19.

In step S19, it is determined whether the value of the number count parameter NUG is greater than 10. When it is determined that the value of the number count parameter NUG is greater than 10, the operation proceeds directly to step S26; otherwise, the operation proceeds directly to step S21.

In other words, when the value of the number count parameter NUG exceeds 10 (the number of times (cycles) of the dust removal operation is equal to or greater than the predetermined number of times (10 times)) before the third time period (10000 ms) has elapsed, the operation proceeds directly to step S26 (not through steps S21 and S22). In this case, because both the value of the count start parameter GEN and the value of the dust removal state parameter GP are 0, the dust removal operation is not performed (the operation does not proceed to step S51 in FIG. 5) even if the first or second interruption process of the timer commences. Therefore, the dust removal operation is halted until the third time period, beginning from the point when counting the number of times of the dust removal operation commences, has elapsed.

In step S20, the value of the time count parameter GCNT and the value of the number count parameter NUG are set to 0. In step S21, the value of the count start parameter GEN is set to 1.

In step S22, the value of the dust removal state parameter GP is set to 1 and the value of the dust removal time parameter CNT is set to 0.

In step S23, it is determined whether the value of the dust removal time parameter CNT is greater than 220. When it is determined that the value of the dust removal time parameter CNT is greater than 220, the operation continues to step S24; otherwise, the operation in step S23 is repeated.

In step S24, the value of the dust removal state parameter GP is set to 0.

In step S25, the value of the number count parameter NUG is increased by 1 and the operation continues to step S26.

In step S26, it is determined whether the photometric switch 12*a* is set to the ON state. When it is determined that the photometric switch 12*a* is set to the ON state, the operation continues to step S27; otherwise, the operation returns to step S15.

In step S27, it is determined whether the anti-shake switch 14*a* is set to the ON state. When it is determined that the anti-shake switch 14*a* is not set to the ON state, the value of the anti-shake parameter IS is set to 0 in step S28; otherwise, the value of the anti-shake parameter IS is set to 1 in step S29.

In step S30, the AE sensor of the AE unit 23 is driven, the photometric operation is performed, and the aperture value and exposure time are calculated.

In step S31, the AF sensor and the lens control circuit of the AF unit 24 are driven to perform the AF sensing and focus operations, respectively.

In step S32, it is determined whether the release switch 13*a* is set to the ON state. When the release switch 13*a* is not set to the ON state, the operation returns to step S15 and the process in steps S15 to S31 is repeated; otherwise, the operation continues on to step S33 and the release sequence operation commences.

In step S33, the value of the release state parameter RP is set to 1. In step S34, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain in the shutter) commences, in step S35.

In step S36, the exposure operation, or in other words the electric charge accumulation of the imaging device (CCD etc.), is performed. After the exposure time has elapsed, the closing operation of the shutter (the movement of the rear curtain in the shutter), the mirror-down operation, and the opening operation of the aperture are performed by the mirror-aperture-shutter unit 18 in step S37.

In step S38, the electric charge which has accumulated in the imaging device during the exposure time is read. In step S39, the CPU 21 communicates with the DSP 19 so that the image processing operation is performed based on the electric charge read from the imaging device. The image, on which the image processing operation is performed, is stored to the memory in the photographing apparatus 1. In step S40, the image that is stored in the memory is displayed on the indicating unit 17. In step S41, the value of the release state parameter RP is set to 0 so that the release sequence operation is finished, and the operation then returns to step S15. In other words, the photographing apparatus 1 is set to a state where the next imaging operation can be performed.

Figure 5:
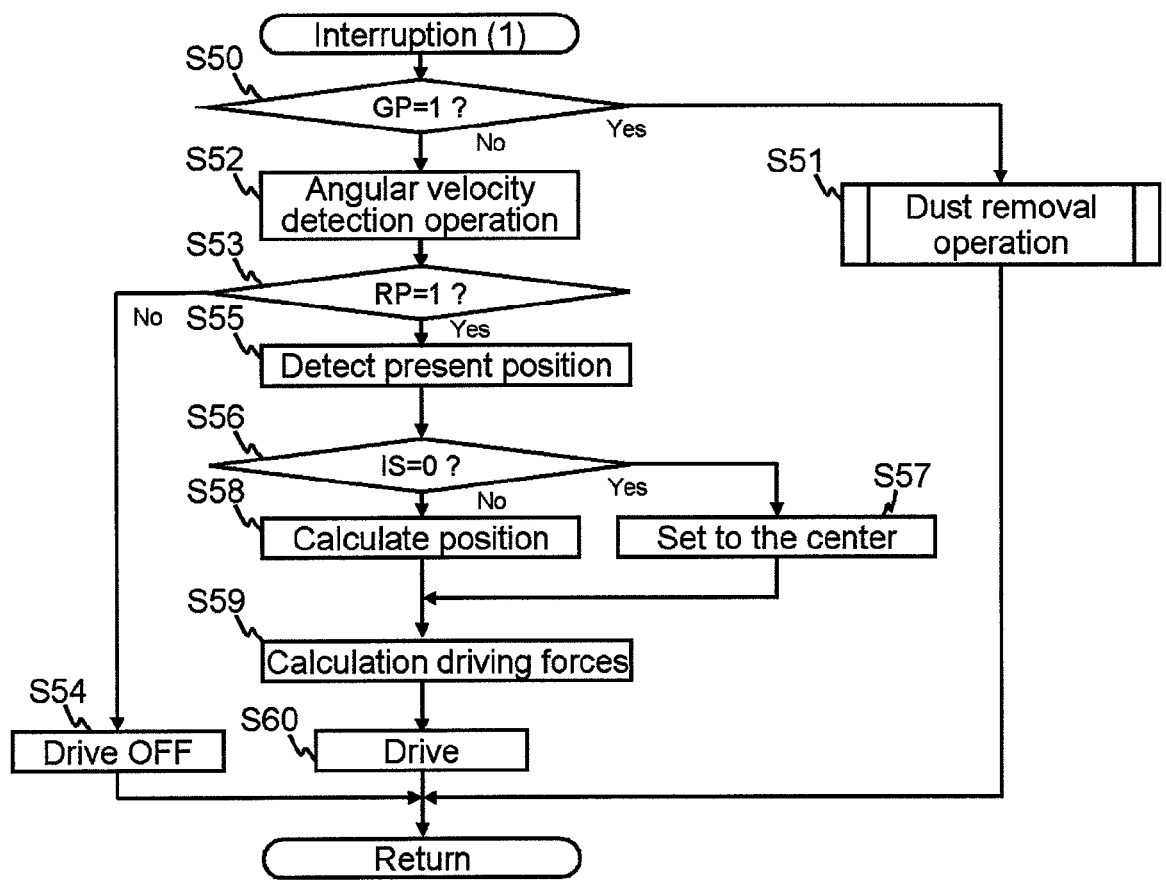
FIG. 5 is a flowchart that shows the detail of the first interruption process of the timer.

Next, the first interruption process of the timer, which commences in step S12 in FIG. 4 and is performed at every predetermined time interval (1 ms) independent of the other operations, is explained by using the flowchart in FIG. 5.

When the first interruption process of the timer commences, it is determined whether the value of the dust removal state parameter GP is set to 1, in step S50. When it is determined that the value of the dust removal state parameter GP is set to 1, the operation continues to step S51; otherwise, the operation proceeds directly to step S52.

In step S51, the dust removal operation is performed. The detail of the dust removal operation is explained later by using the flowchart in FIG. 7.

In step S52, the first angular velocity vx, which is output from the angular velocity detection unit 25, is input to the A/D converter A/D 0 of the CPU 21 and converted to the first digital angular velocity signal $Vx_n$. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$).

In step S53, it is determined whether the value of the release state parameter RP is set to 1. When it is determined that the value of the release state parameter RP is not set to 1, the driving control of the movable unit 30a is set to the OFF state, in other words, the anti-shake unit 30 is set to a state where the driving control of the movable unit 30a is not performed in step S54; otherwise, the operation proceeds directly to step S55.

In step S55, the hall element unit 44a detects the position of the movable unit 30a, and the first and second detected position signals px and py are calculated by the hall-element signal-processing unit 45. The first detected position signal px is then input to the A/D converter A/D 2 of the CPU 21 and converted to a digital signal $pdx_n$, whereas the second detected position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S56, it is determined whether the value of the anti-shake parameter IS is 0. When it is determined that the value of the anti-shake parameter IS is 0 (IS=0), in other words when the photographing apparatus is not in anti-shake mode, the position S ($Sx_n$, $Sy_n$) where the movable unit 30a (the imaging unit 39a) should be moved is set at the center of the range of movement of the movable unit 30a, in step S57. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S58.

In step S59, the first driving force $Dx_n$ (the first PWM duty dx) and the second driving force $Dy_n$ (the second PWM duty dy) of the driving force $D_n$ that moves the movable unit 30a to the position $S_n$ are calculated on the basis of the position $S_n$ ($Sx_n$, $Sy_n$) that was determined in step S57 or step S58, and the present position $P_n$ ($pdx_n$, $pdy_n$).

In step S60, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S59 and S60 is an automatic control calculation that is used with the PID automatic control for performing general (normal) proportional, integral, and differential calculations.

Next, the dust removal operation, which commences in step S51 in FIG. 5, is explained by using the flowchart in FIG. 7.

When the dust removal operation commences, the value of the dust removal time parameter CNT is increased by 1, in step S71.

In step S72, the hall element unit 44a detects the position of the movable unit 30a, and the first and second detected position signals px and py are calculated by the hall-element signal-processing unit 45. The first detected position signal px is then input to the A/D converter A/D 2 of the CPU 21 and converted to a digital signal $pdx_n$, whereas the second detected position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S73, it is determined whether the value of the dust removal time parameter CNT is less than or equal to 65. When it is determined that the value of the dust removal time parameter CNT is less than or equal to 65, the operation proceeds directly to step S84; otherwise, the operation continues to step S74.

In step S74, it is determined whether the value of the dust removal time parameter CNT is less than or equal to 115. When it is determined that the value of the dust removal time parameter CNT is less than or equal to 115, the operation proceeds directly to step S83; otherwise, the operation continues to step S75.

In step S75, it is determined whether the value of the dust removal time parameter CNT is less than or equal to 165. When it is determined that the value of the dust removal time parameter CNT is less than or equal to 165, the operation proceeds directly to step S82; otherwise, the operation continues to step S76.

In step S76, it is determined whether the value of the dust removal time parameter CNT is less than or equal to 215. When it is determined that the value of the dust removal time parameter CNT is less than or equal to 215, the operation proceeds directly to step S78; otherwise, the operation continues to step S77.

In step S77, the driving control of the movable unit 30a is set to the OFF state, in other words, the anti-shake unit 30 is set to a state where the driving control of the movable unit 30a is not performed.

In steps S78 and S83, the value of the second PWM duty dy is set to −DD. In step S82, the value of the second PWM duty dy is set to +DD.

The absolute value |DD| (the absolute value of a dust removal duty ratio DD) is set so that the acceleration of the movable unit 30a at point in time when the movable unit 30a is moved to and struck against the boundary of the range of movement of the movable unit 30a is increased to the degree where the dust on the movable unit 30a can be removed by the shock of the impact.

In step S79, the coordinate of position $S_n$ in the first direction x, $Sx_n$, where the movable unit 30a (the imaging unit 39a) should be moved in the first direction x is set at the center of the range of movement of the movable unit 30a in the first direction x.

In step S80, the first driving force $Dx_n$ (the first PWM duty dx) of the driving force $D_n$ that moves (holds) the movable unit 30a to the position $S_n$ in the first direction x (the center in the first direction x), is calculated on the basis of the coordinate of position $S_n$ in the first direction x, $Sx_n$ that was determined in step S79, and the coordinate of the present position $P_n$ after A/D conversion in the first direction x: $pdx_n$.

In step S81, the first driving coil unit 31a is driven by applying the first PWM duty dx calculated in step S80 to the driver circuit 29, and the second driving coil unit 32a is driven by applying the second PWM duty dy calculated in step S78, S82, or S83 to the driver circuit 29, so that the movable unit 30a is moved to position $S_n$ ($Sx_n$, $Sy_n$).

In step S84, the position $S_n$ ($Sx_n$, $Sy_n$) where the movable unit 30a (the imaging unit 39a) should be moved is set at the center of the range of movement of the movable unit 30a.

In step S85, the first driving force $Dx_n$ (the first PWM duty dx) and the second driving force $Dy_n$ (the second PWM duty dy) of the driving force $D_n$ that moves the movable unit 30a to the position $S_n$, are calculated on the basis of the position $S_n$ ($Sx_n$, $Sy_n$) that was determined in step S84, and the present position $P_n$ ($pdx_n$, $pdy_n$).

In step S86, the first driving coil unit 31a is driven by applying the first PWM duty dx to the driver circuit 29 calculated in step S85, and the second driving coil unit 32a is driven by applying the second PWM duty dy to the driver circuit 29 calculated in step S85, so that the movable unit 30a is moved to position $S_n$ ($Sx_n$, $Sy_n$).

Figure 10:
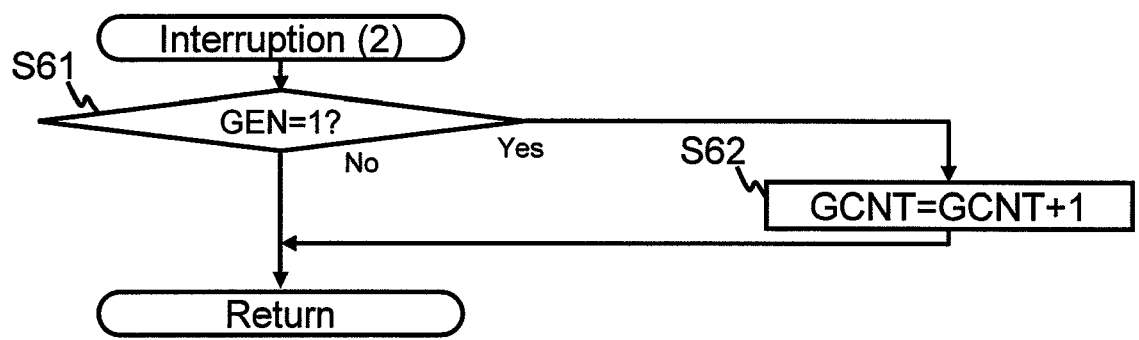
FIG. 10 is a flowchart that shows the detail of the second interruption process of the timer.

Next, the second interruption process of the timer, which commences in step S12 in FIG. 4 and is performed at every predetermined time interval (1 ms) independent of the other operations, is explained by using the flowchart in FIG. 10.

When the second interruption process of the timer commences, it is determined whether the value of the count start parameter GEN is set to 1. When it is determined that the value of the count start parameter GEN is set to 1, the value of the time count parameter GCNT is increased by 1 in step S62, and then the second interruption process of the timer is finished; otherwise, the second interruption process of the timer is finished without operation.

Figure 8:
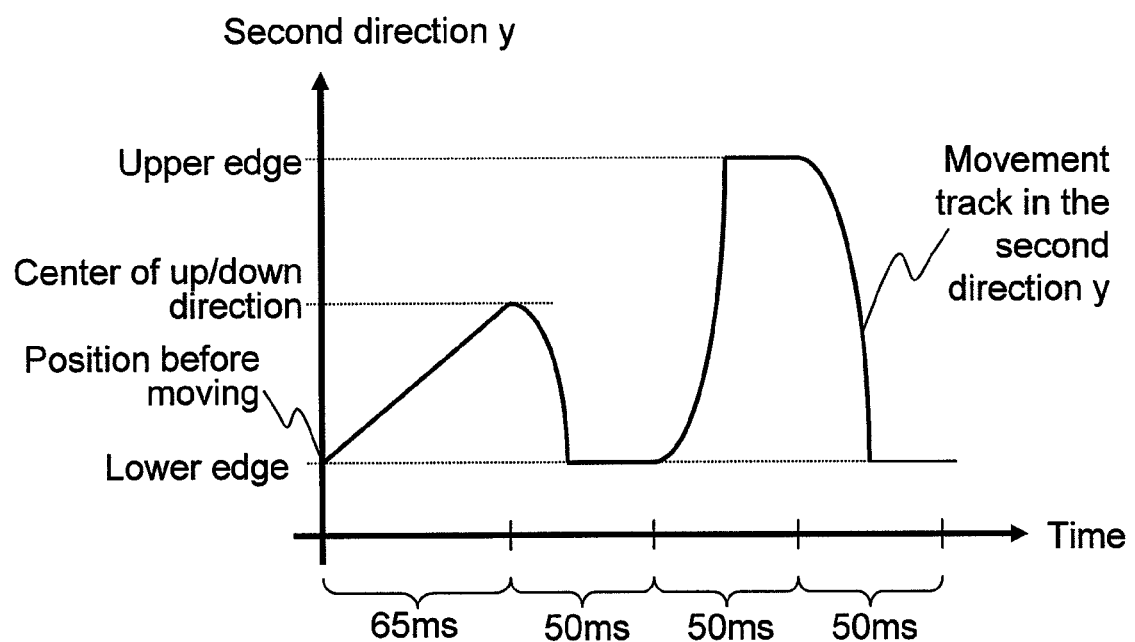
FIG. 8 is a graph that shows the relationship between an elapsed time and the position of the movable unit in the second direction in the dust removal operation.
Figure 9:
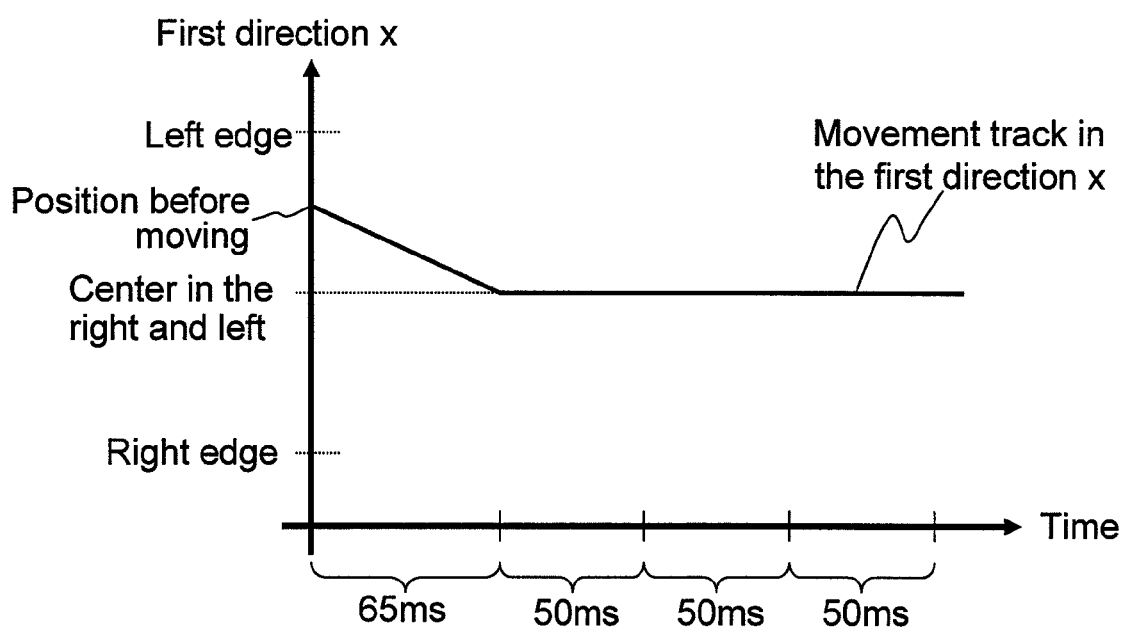
FIG. 9 is a graph that shows the relationship between an elapsed time and the position of the movable unit in the first direction in the dust removal operation.

In the embodiment, in the first time period, from the point when the photographing apparatus 1 is set to the ON state to the point when the anti-shake operation commences, the movable unit 30a including the imaging device is moved to the center and then is moved to and struck against one side and then the other side of the boundary of the range of movement of the movable unit 30a, under the condition where the coordinate value in the first direction x of the movable unit 30a is held constant at the center (see FIGS. 8 and 9).

The dust on the imaging unit 39a of the movable unit 30a (the imaging device and the low-pass filter) can be removed by the shock of the impact of the movable unit 30a against the boundary of the range of movement of the movable unit 30a.

In the dust removal operation, the position of the movable unit 30a in the first direction x is held constant at the center of the range of movement in the first direction x. Accordingly, the movable unit 30a in the first direction x does not make contact with the boundary of the range of movement in the first direction x, while the movable unit 30a is moved in the second direction y. As a result, the movable unit 30a and the fixed unit 30b are not damaged.

The dust removal operation may be halted in a predetermined time period (for example 10 sec) as another embodiment; however, in the embodiment, the continuous length of time the dust removal operations are performed (the elapsed time from the point when counting the number of times of the dust removal operation commences) is measured and the number of times of the dust removal operation during the elapsed time is counted so that the dust removal operation is halted when the elapsed time is less than or equal to the third time period (10000 ms), and when the number of times of the dust removal operation is equal to or exceeds the predetermined number of times (10 times).

Therefore, the number of times that the movable unit 30a is struck against the boundary of the range of movement of the movable unit 30a in a short time period (the third time period) for the dust removal operation can be limited, in order to prevent damage to the movable unit 30a etc. caused by heat and shock from continuous impact between the movable unit 30a and the boundary of the range of movement of the movable unit 30a.

Further, if the dust removal operation is halted once, the dust removal operation can be resumed after the third time period (10000 ms) from the commencement of counting the number of times of the dust removal operation. So, even if the dust removal operation is temporarily halted, discomfort that the operator of the photographing apparatus 1 feels can be restrained.

In the embodiment, as the dust removal operation, the movable unit 30a is held constant at the center in the first direction x (the longer direction) and moved in the second direction y (the shorter direction), under the condition where the range of movement of the movable unit 30a in the first direction x is longer than that in the second direction y. In this case, the possibility of the removed dust re-adhering can be reduced compared to the case where the movable unit 30a is held constant at the center in the second direction y and moved in the first direction x.

However, the movable unit 30a may be held constant at the center in the second direction y, and moved in the first direction x.

Further, the position where the movable unit 30a is moved to when the dust removal operation commences is not limited to the center of the range of movement of the movable unit 30a. It may be any position where the movable unit 30a does not make contact with the boundary of the range of movement of the movable unit 30a.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-276860 (filed on Oct. 10, 2006), which is expressly incorporated herein by reference, in its entirety.

The invention claimed is:

1. A dust removal apparatus of a photographing apparatus, comprising:
   a movable unit that has an imaging device and that is movable; and
   a controller that strikes said movable unit against a boundary of a range of movement of said movable unit as a dust removal operation, said controller counting the number of times that said dust removal operation is performed and measuring an elapsed time from a point when counting said number of times that said dust removal operation is performed commences;
   when said elapsed time is less than or equal to a time period and said number of times that said dust removal operation is performed is equal to or greater than a predetermined number of times, said controller halting said dust removal operation until a predetermined time period has elapsed.

2. The dust removal apparatus according to claim 1, further comprising a dust removal switch that is used for switching between whether or not said dust removal operation is performed;
   wherein said controller performs said dust removal operation when said dust removal switch is set to the ON state and said elapsed time exceeds said time period, or when said dust removal switch is set to the ON state and said elapsed time is less than or equal to said time period and said number of times that said dust removal operation is performed does not exceed said predetermined number of times.

3. The dust removal apparatus according to claim 1, wherein said movable unit is movable on a plane that is parallel to a first direction and a second direction, said first direction being perpendicular to an optical axis of a photographing optical system that captures an optical image on a photographing surface of said imaging device, said second direction being perpendicular to said first direction and to said optical axis; and
   said controller moves said movable unit to a predetermined position that does not make contact with said boundary of said range of movement, and strikes said movable unit against said boundary of said range of movement in said second direction while a coordinate value in said first direction of said movable unit is held constant, to perform said dust removal operation.

4. The dust removal apparatus according to claim 1, wherein repeated impact of said movable unit with said boundary in said second direction to perform said dust removal operation is executed such that said controller moves said movable unit to strike against one side of said boundary in said second direction, to strike against an other side of said boundary in said second direction, and to again strike against said one side of said boundary in said second direction, in this order.

5. The dust removal apparatus according to claim 1, wherein said controller moves said movable unit in said range of movement for an anti-shake operation for image stabilizing; and
   said dust removal operation is performed before said anti-shake operation commences.

6. The dust removal apparatus according to claim 1, wherein said predetermined time period elapses when said elapsed time exceeds said time period.

7. The dust removal apparatus according to claim 1, wherein said elapsed time is reset to 0 when said elapsed time exceeds said time period, so that said elapsed time is measured again.

8. The dust removal apparatus according to claim 1, wherein said controller moves the movable unit to a predetermined position before commencing the dust removal operation.

9. The dust removal apparatus according to claim 8, wherein the predetermined position is a center of the range of movement.

10. The dust removal apparatus according to claim 1, wherein a force of impact of a first strike of the movable unit with a boundary of the range of movement is less than a force of impact of a second strike of the movable unit with a boundary of range of movement.

11. The dust removal apparatus according to claim 1, a buffer member being provided at a position where the movable unit strikes against the boundary of the range of movement of the movable unit.

12. The dust removal apparatus according to claim 1, the range of movement for the dust removal operation being defined by a fixed member of an anti-shake mechanism.

13. The dust removal apparatus according to claim 1, said controller being configured to enable the dust removal operation to resume after the elapse of the predetermined time period.

14. The dust removal apparatus according to claim 1, wherein each strike by the movable unit against a boundary of the range of movement of the movable unit serves to remove dust from the imaging device of the movable unit.

15. The dust removal apparatus according to claim 1, the imaging device having a rectangular shape with a first side that is longer than a second side that extends in a direction transverse to the first side, and in the dust removal operation the movable member is held and a constant coordinate corresponding to a center of the first side and moved in a direction of the second side.

16. The dust removal apparatus according to claim 1, wherein said imaging device is movable together with said movable unit to perform the dust removal operation.

* * * * *